H. BOLINDER.
PLOWSHARE.
APPLICATION FILED SEPT. 7, 1911.
1,052,456.
Patented Feb. 11, 1913.
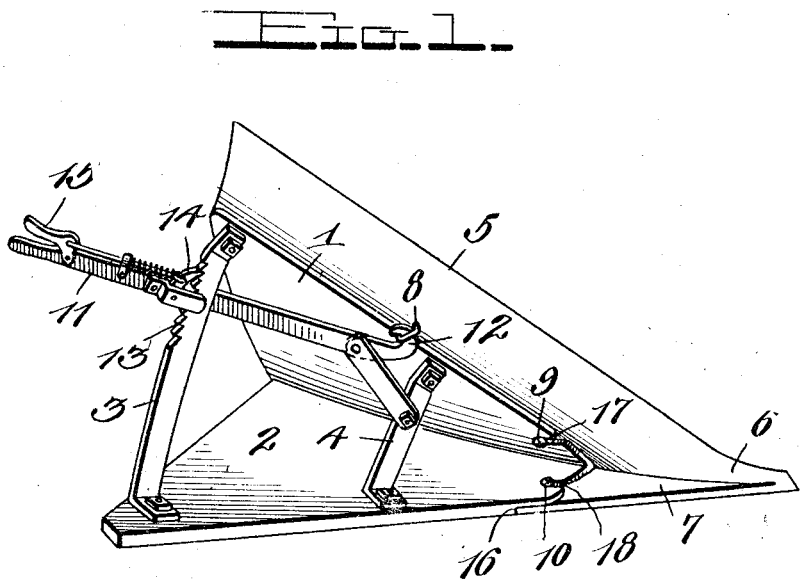
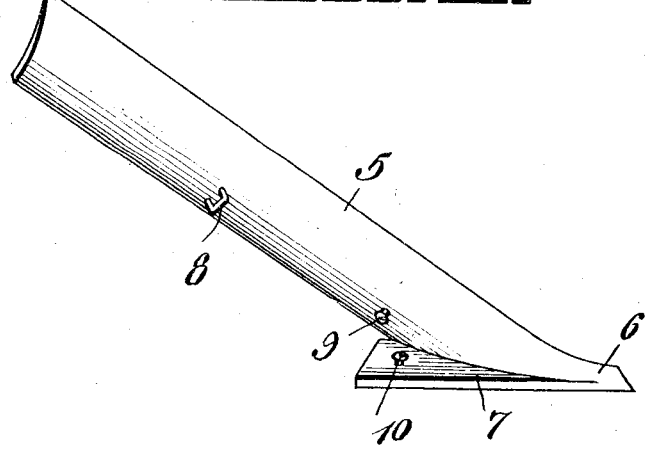
Inventor
Hilding Bolinder,
Witnesses
Chas. L. Griesbauer.
Herbert J. Jacobi.
By Watson E. Coleman.
Attorney

UNITED STATES PATENT OFFICE.

HILDING BOLINDER, OF LEINAN, SASKATCHEWAN, CANADA.

PLOWSHARE.

1,052,456.   Specification of Letters Patent.   Patented Feb. 11, 1913.

Application filed September 7, 1911. Serial No. 648,115.

*To all whom it may concern:*

Be it known that I, HILDING BOLINDER, subject of the King of England, residing at Leinan, Province of Saskatchewan, and Dominion of Canada, have invented certain new and useful Improvements in Plowshares, of which the following is a specification, reference being had to the accompanying drawings.

My invention relates to new and useful improvements in plow shares and more particularly to a detachable plow share, and my object is to provide a device of this character which may be readily and quickly removed from and replaced upon the mold board and landside of the plow.

A further object of the invention resides in the provision of means for securing the plow share to the mold board and landside with the entire elimination of the customary bolts used.

A still further object resides in providing a pivoted lever between the mold board and landside, which lever is provided with a hook adapted to engage portions of the plow share to aid in retaining the latter in position, and a still further object resides in providing pins in the plow share which are adapted to enter openings in the mold board and landside, whereby the plow share with its engagement by the hook and lever, will be retained in position.

Still another object resides in providing a pawl and ratchet in connection with the lever to secure the lever in its adjusted and effective position, and a still further object resides in providing a device which is extremely simple in construction, thereby readily and cheaply manufactured, one which is durable in construction, and very effective and useful in operation.

With these and other objects in view, my invention consists in the novel features of construction, combination and arrangement of parts as will be hereinafter referred to and more particularly pointed out in the specification and claims.

In the accompanying drawing forming a part of this application, Figure 1 is a perspective view of a mold board and landside showing my detachable plow share applied to use thereon, and Fig. 2 is a perspective view of the plow share removed.

In carrying out my invention, I shall refer to the drawing in which similar reference characters designate corresponding parts throughout the several views and in which—

1 and 2 indicate, respectively, the mold board and landside of a plow braced by the usual or any preferred bracing bars 3 and 4. Adapted to be detachably secured to the upper edge of the mold board, is a plow share 5, the point 6 of which is provided with the flange 7 adapted to contact with the landside 2, and in order to secure said share to the mold board and landside, the same is provided intermediate of its ends with a staple or the like 8 and adjacent the point with the headed pins 9 and 10, respectively. A lever 11 has one end thereof pivotally mounted on the bracing bar 4 and is provided adjacent its pivoted end with a hook 12 which may be formed integral or otherwise secured thereto and which is adapted to engage the staple 8 of the plow share to retain the latter on the mold board. This lever 11 is guided past the rear bracing bar 3 which has one edge thereof provided with teeth 13 to form a rack, and said lever is also provided with a spring detent 14 adapted to engage said teeth, whereby said lever may be held in any desired position. This detent is spring-actuated so as to normally engage the teeth 13, and a handle grip 15 is provided adjacent the handle of the lever 11 which connects with said detent, whereby the same may be withdrawn from its effective engagement with the teeth, when desired, thereby allowing the lever to be operated one way or the other to correspondingly release the hook 12 from its engagement with the staple 8 or force the same into engagement therewith.

In positioning the plow share on the mold board, the flange portion 7 adjacent the point thereof is adapted to abut the forward edge of the landside 2, and in order to provide a flush joint at this point, the under face of the landside and the upper face of the flange 7 are offset, as shown at 16. It has been stated that the headed pins 9 and 10 are disposed adjacent the point 6 of the plow share, but it will be observed that the pin 10 is disposed on the flange 7, and in positioning the plow share on the mold board, these pins are entered in slots 17 and 18 which are, respectively, disposed in the mold board and landside. These slots are enlarged at one end thereof to allow the heads of the pins to enter therethrough, so that when properly positioned in said slots, the pins will secure the forward portion of the plow share to the mold board and landside in addition to the securing means that the hook 12 has with said share, so that when positioned properly, said share is not adapted to be disengaged by any other than manual means.

It is a well known fact that in the plows of the present day wherein numerous forms of plow shares are used in connection with a single landside and mold board, considerable time and trouble are experienced in removing and replacing the shares, in view of the nuts and bolts that must be manipulated, but it will be appreciated that with the use of my improved device, all such difficulties that have been heretofore experienced, will be obviated. It will further be seen that although the device may be quickly and easily removed and applied to use, it will also be held securely throughout the operation thereof. It will still further be seen that the device is extremely simple in construction, whereby the same may be readily and cheaply manufactured, and one which is durable in use and very effective and useful in operation.

What I claim is:—

1. In a device of the class described, the combination with a mold-board and land side, the forward ends of the same being provided with slots, and a pair of bracing arms between said land side and mold-board; of a detachable plow share, means carried on the share adjacent the point thereof and adapted to enter the slots of said mold-board and land side, a staple carried on the share intermediate of the ends thereof, a lever having pivotal connection with one of said bracing arms and provided with a hook at the free end thereof adapted for engagement with the staple on said plow share, and means to retain said lever in various adjusted positions.

2. In a device of the class described, the combination with a mold-board and land side, each provided with a slot at the forward end thereof, a pair of bracing arms between said mold-board and land side, one of said arms being provided with a plurality of ratchet teeth; of a detachable plow share having a vertical flange formed adjacent the point thereof, said flange forming a land side for the share, pins carried on said flange and share adapted to enter the aforesaid slots in said land side and mold-board, a staple also carried on said share intermediate of its ends, a lever having pivotal connection with one of said bracing arms and provided with a hook at the free end thereof adapted for engagement with said staple, and a spring detent carried on said lever adapted for engagement with the teeth of said bracing arm to retain the lever and correspondingly said plow share in various adjusted positions.

In testimony whereof I hereunto affix my signature in the presence of two witnesses.

HILDING BOLINDER.

Witnesses:
AXEL L. LEINAN,
THOMAS M. BAKKEN.